United States Patent
Zhang et al.

(10) Patent No.: US 10,090,956 B2
(45) Date of Patent: Oct. 2, 2018

(54) MECHANISMS FOR INFORMATION EXCHANGE ACROSS CELLS TO FACILITATE RECEPTION IN A HETEROGENEOUS NETWORK

(75) Inventors: Xiaoxia Zhang, San Diego, CA (US); Durga Prasad Malladi, San Diego, CA (US); Yongbin Wei, San Diego, CA (US); Tao Luo, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/816,263

(22) Filed: Jun. 15, 2010

(65) Prior Publication Data

US 2011/0141971 A1    Jun. 16, 2011

Related U.S. Application Data

(60) Provisional application No. 61/187,589, filed on Jun. 16, 2009.

(51) Int. Cl.
| | |
|---|---|
| *H04W 4/00* | (2009.01) |
| *H04J 11/00* | (2006.01) |
| *H04W 84/04* | (2009.01) |
| *H04W 92/20* | (2009.01) |

(52) U.S. Cl.
CPC ......... *H04J 11/004* (2013.01); *H04W 84/045* (2013.01); *H04W 92/20* (2013.01)

(58) Field of Classification Search
CPC ...... H04W 24/00; H04W 24/04; H04W 24/10
See application file for complete search history.

(56) References Cited

U.S. PATENT DOCUMENTS

| | | | | |
|---|---|---|---|---|
| 5,966,657 | A  * | 10/1999 | Sporre | ............... 455/425 |
| 8,295,229 | B2 * | 10/2012 | Vujcic | ....... H04B 1/7073 370/328 |
| 2005/0232195 | A1* | 10/2005 | Jones | ............... 370/329 |
| 2007/0040704 | A1 | 2/2007 | Smee et al. | |
| 2008/0123760 | A1 | 5/2008 | Oh et al. | |

(Continued)

FOREIGN PATENT DOCUMENTS

| | | |
|---|---|---|
| CN | 101297560 A | 10/2008 |
| CN | 101574000 A | 11/2009 |

(Continued)

OTHER PUBLICATIONS

3GPP Draft; 25814-150, 3rd Generation Partnership Project (3GPP), Mobile Competence Centre ; 650, Route Des Lucioles ; F-06921 Sophia-Antipolis Cedex ; France, vol. RAN WG1, No. Shanghai, China; May 26, 2006, XP050102001 pp. 29-30 p. 76 pp. 89-90.

(Continued)

*Primary Examiner* — Rhonda Murphy
(74) *Attorney, Agent, or Firm* — Patterson & Sheridan, LLP

(57) ABSTRACT

A method, an apparatus, and a computer program product for wireless communication are provided in which a signal including a signal from a UE is received. System information of a neighboring eNodeB is obtained. The received signal is processed based on the system information in order to enhance the received signal with respect to the signal from the UE.

30 Claims, 13 Drawing Sheets

(56) References Cited

U.S. PATENT DOCUMENTS

| | | | |
|---|---|---|---|
| 2008/0146154 A1 | 6/2008 | Claussen et al. | |
| 2008/0310396 A1 | 12/2008 | Park et al. | |
| 2009/0168906 A1* | 7/2009 | Hagerman et al. | 375/260 |
| 2009/0197630 A1* | 8/2009 | Ahn et al. | 455/522 |
| 2009/0290549 A1* | 11/2009 | Tiirola | H04L 5/0053 370/329 |
| 2010/0022250 A1* | 1/2010 | Petrovic et al. | 455/450 |
| 2010/0075658 A1* | 3/2010 | Hou | H04W 48/02 455/422.1 |
| 2011/0007673 A1* | 1/2011 | Ahn | H04L 1/1607 370/280 |
| 2011/0007689 A1 | 1/2011 | Shen et al. | |
| 2011/0034192 A1* | 2/2011 | Lim et al. | 455/501 |
| 2013/0315168 A1* | 11/2013 | Frank | G01S 5/10 370/329 |

FOREIGN PATENT DOCUMENTS

| | | |
|---|---|---|
| EP | 0752766 A1 | 1/1997 |
| EP | 1734773 A1 | 12/2006 |
| EP | 1919231 | 5/2008 |
| EP | 1926217 A2 | 5/2008 |
| EP | 2217010 A1 | 8/2010 |
| JP | 2009506660 A | 2/2009 |
| JP | 2009507438 A | 2/2009 |
| JP | 2009514325 A | 4/2009 |
| JP | 2010512680 A | 4/2010 |
| JP | 2011503942 A | 1/2011 |
| KR | 20080047028 A | 5/2008 |
| WO | WO-9623371 A1 | 8/1996 |
| WO | WO0055992 A1 | 9/2000 |
| WO | 2007028335 A1 | 3/2007 |
| WO | WO2007049998 A1 | 5/2007 |
| WO | WO2008076219 | 6/2008 |
| WO | 2009055973 A1 | 5/2009 |

OTHER PUBLICATIONS

International Search Report and Written Opinion—PCT/US2010/038882, International Search Authority—European Patent Office—Nov. 11, 2010.

Boudreau, et al., "Interference Coordination and Cancellation for 4G Networks", IEEE Communications Magazine, vol. 47, No. 4, Apr. 2009, pp. 74-81.

Taiwan Search Report—TW099119802—TIPO—dated Apr. 16, 2013.

* cited by examiner

MECHANISMS FOR INFORMATION EXCHANGE ACROSS CELLS TO FACILITATE RECEPTION IN A HETEROGENEOUS NETWORK

CROSS-REFERENCE TO RELATED APPLICATIONS

This application claims the benefit of U.S. Provisional Application No. 61/187,589, entitled "System and Method for Information Exchange Across Cells," filed on Jun. 16, 2009, which is expressly incorporated by reference herein in its entirety.

BACKGROUND

Field

The present disclosure relates generally to communication systems, and more particularly, to mechanisms for information exchange across cells to facilitate reception in a heterogeneous network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method of wireless communication includes receiving a signal including a signal from a user equipment (UE). In addition, the method includes obtaining system information of a neighboring eNodeB. Furthermore, the method includes processing the received signal based on the system information in order to enhance the received signal with respect to the signal from the UE.

In an aspect of the disclosure, an apparatus for wireless communication includes means for receiving a signal including a signal from a UE, means for obtaining system information of a neighboring eNodeB, and means for processing the received signal based on the system information in order to enhance the received signal with respect to the signal from the UE.

In an aspect of the disclosure, a computer program product includes a computer-readable medium. The computer-readable medium includes code for receiving a signal including a signal from a UE, obtaining system information of a neighboring eNodeB, and processing the received signal based on the system information in order to enhance the received signal with respect to the signal from the UE.

In an aspect of the disclosure, an apparatus for wireless communication includes a processing system. The processing system is configured to receive a signal including a signal from a UE. The processing system is further configured to obtain system information of a neighboring eNodeB. The processing system is further configured to process the received signal based on the system information in order to enhance the received signal with respect to the signal from the UE.

DETAILED DESCRIPTION

Figure 1:
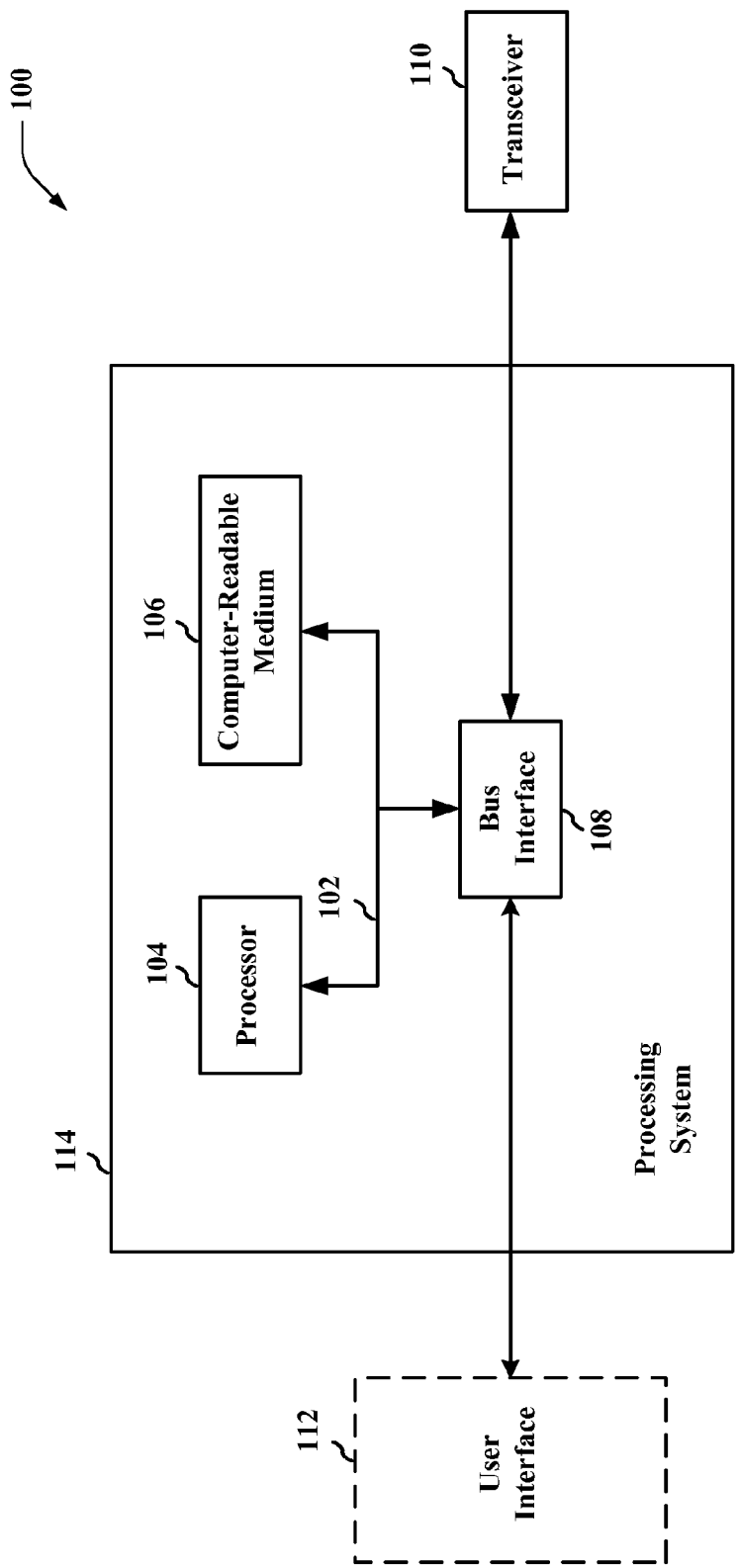
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
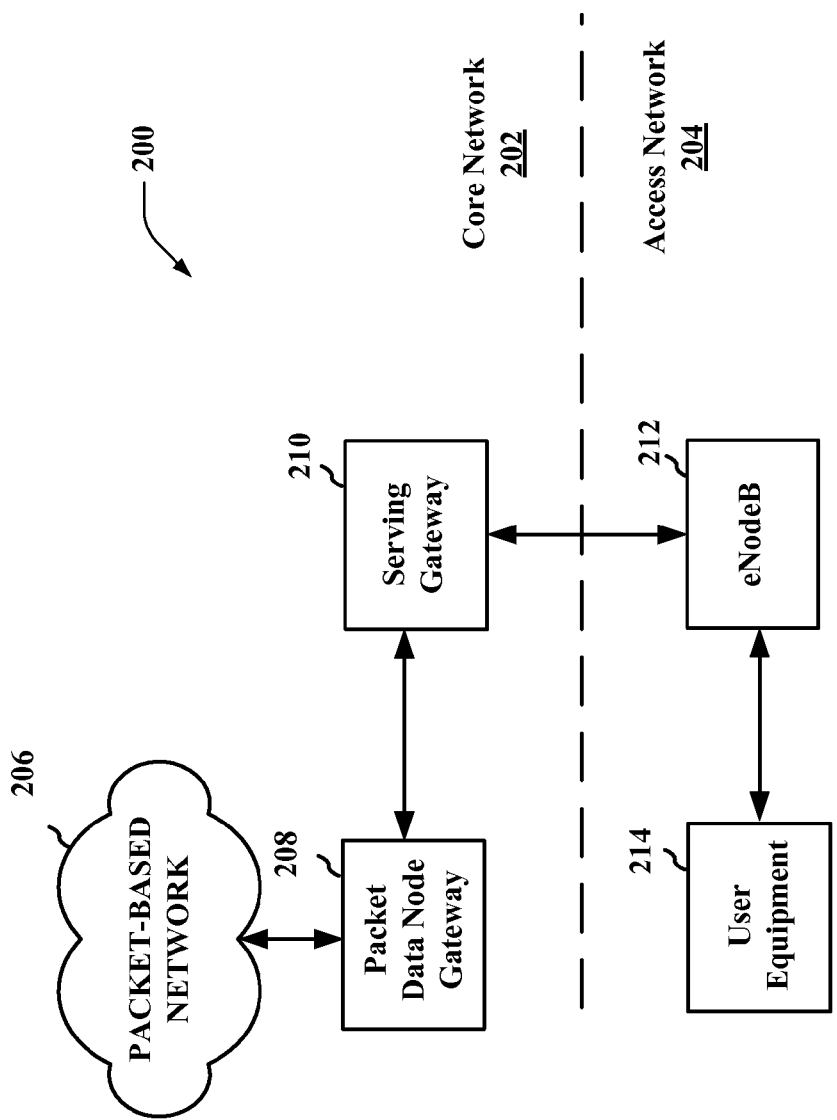
FIG. 2 is a diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an evolved NodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as UE in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. The primary function of the PDN gateway 208 is to provide the UE 214 with network connectivity. Data packets are transferred between the PDN gateway 208 and the UE 214 through the serving gateway 210, which serves as the local mobility anchor as the UE 214 roams through the access network 204.

Figure 3:
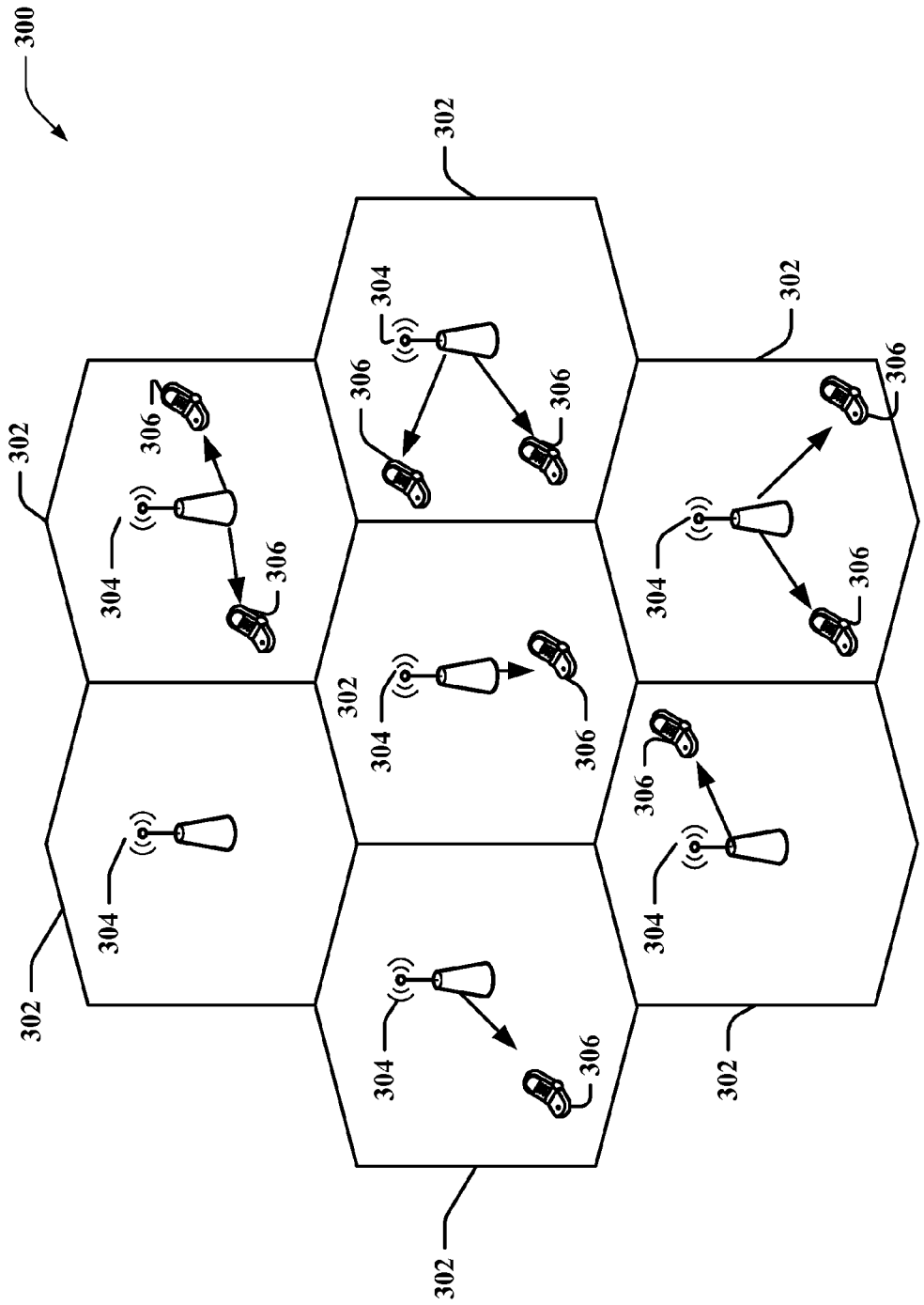
FIG. 3 is a diagram illustrating an example of an access network.

An example of an access network in an LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
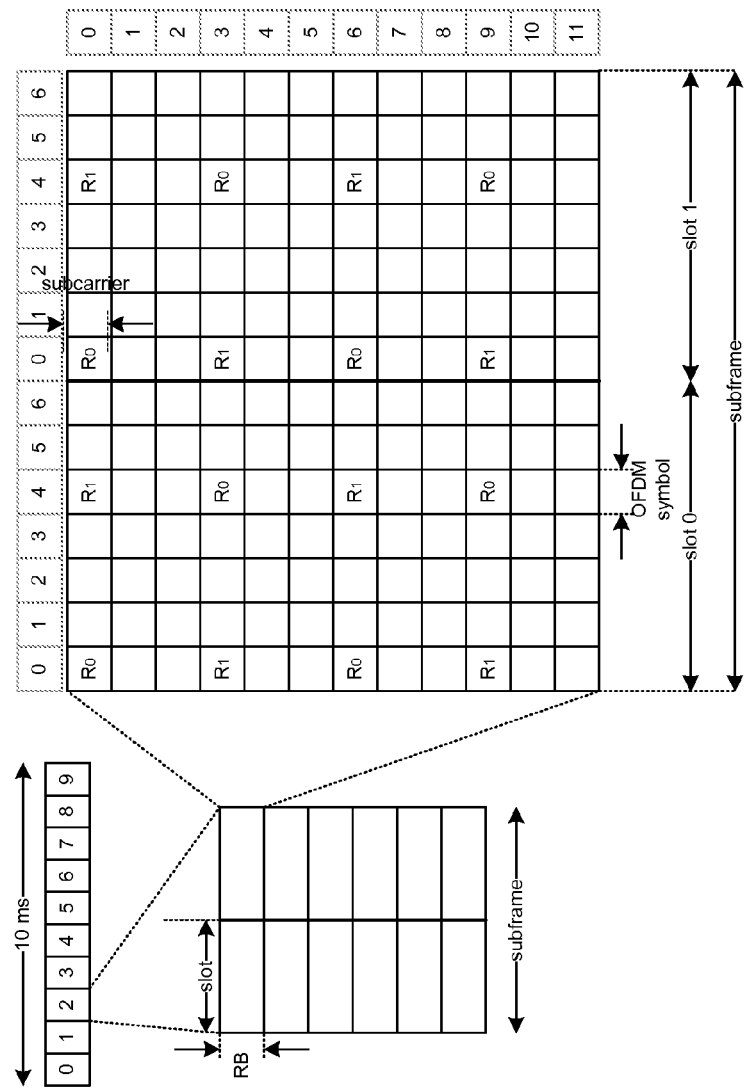
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each two time slots including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as $R_0$ and $R_1$, include a DL reference signal (DL-RS). The DL-RS include Cell-specific RS (CRS) (also sometimes called common RS) and UE-specific RS (UE-RS). UE-RS are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
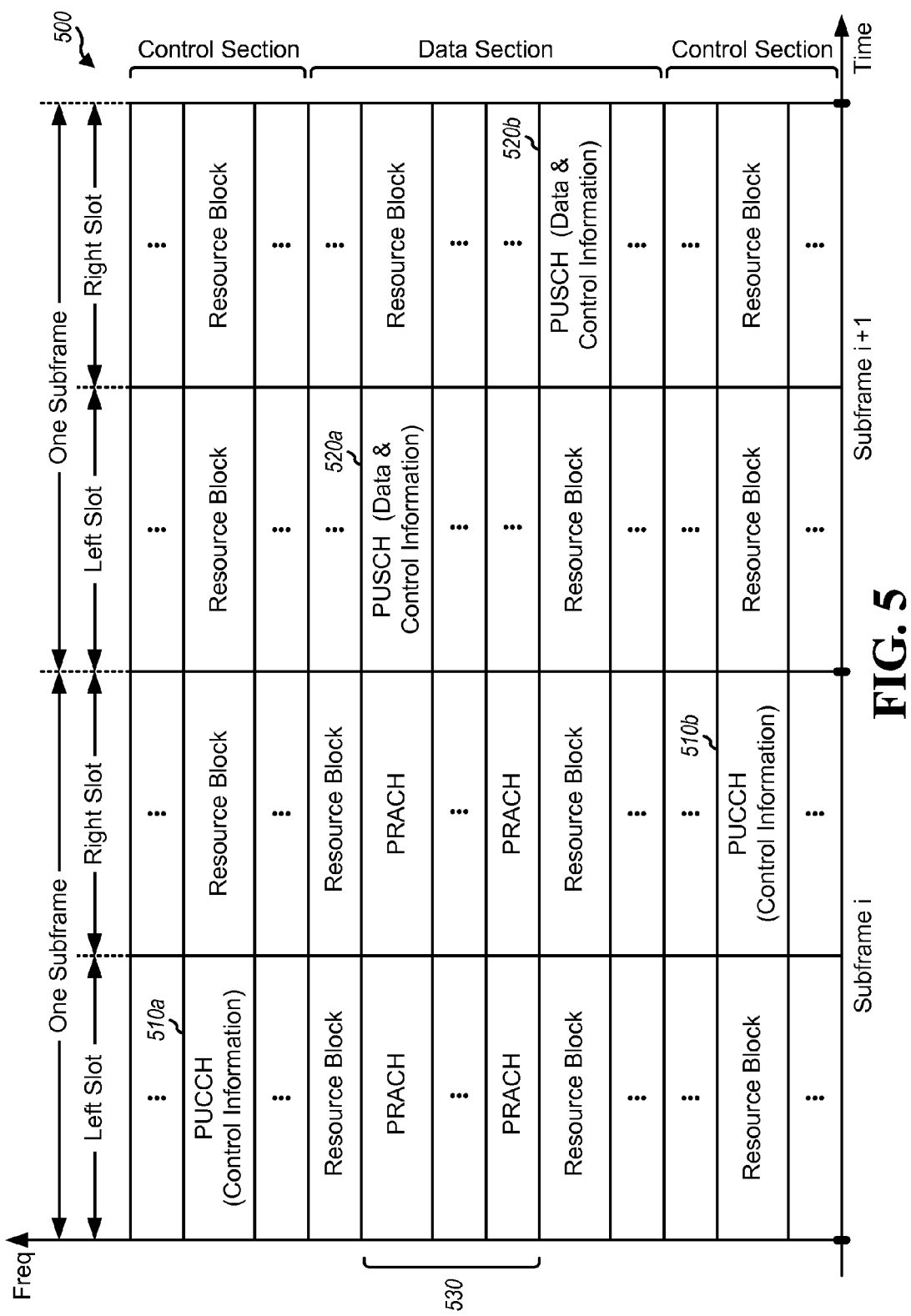
FIG. 5 shows an exemplary format for the UL in LTE.

An example of an UL frame structure will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNodeB. The UE may also be assigned resource blocks 520a, 520b in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An UL transmission may span both slots of a subframe and may hop across frequency as shown in FIG. 5.

As shown in FIG. 5, a set of resource blocks may be used to perform initial system access and achieve UL synchronization in a Physical Random Access Channel (PRACH). The PRACH carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
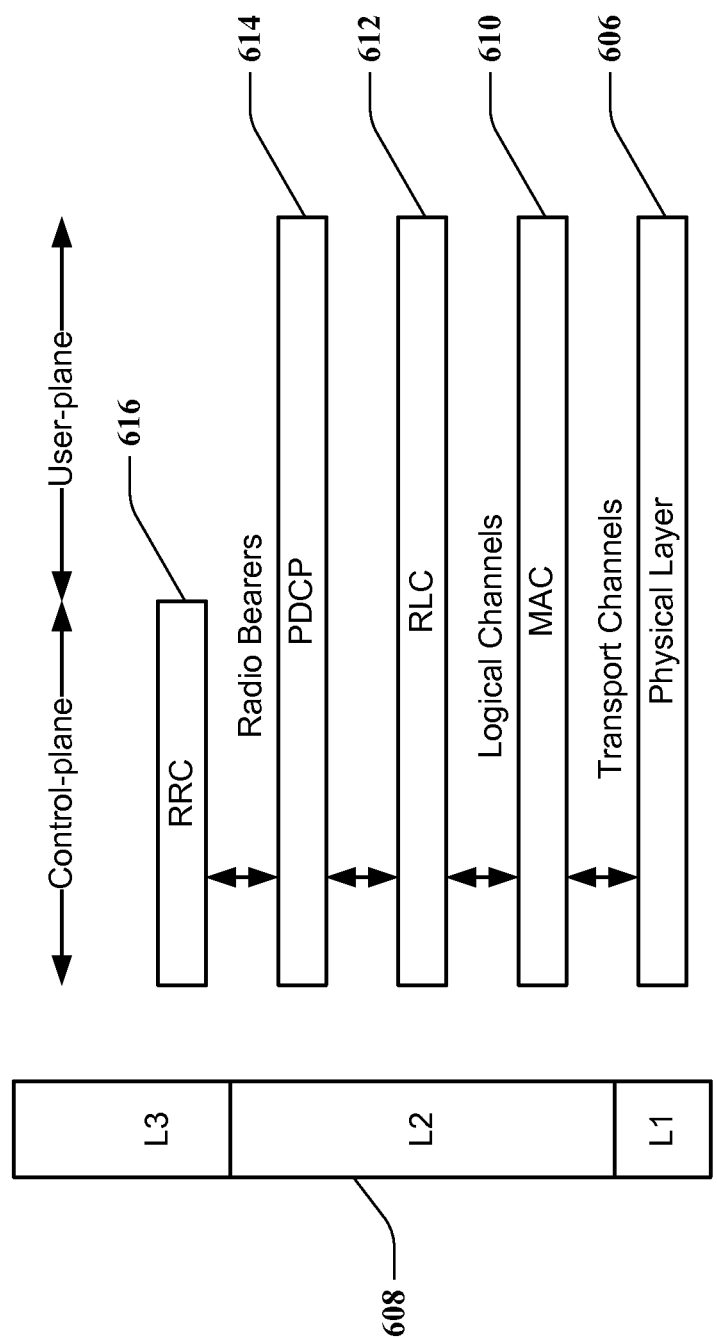
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and eNodeB is shown with three layers: Layer 1, Layer 2, and Layer 3. Layer 1 is the lowest lower and implements various physical layer signal processing functions. Layer 1 will be referred to herein as the physical layer 606. Layer 2 (L2 layer) 608 is above the physical layer 606 and is responsible for the link between the UE and eNodeB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNodeB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNodeBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control pane, the radio protocol architecture for the UE and eNodeB is substantially the same for the physical layer 606 and the L2 layer 608 with the exception that there is no header compression function for the control plane. The control pane also includes a radio resource control (RRC) sublayer 616 in Layer 3. The RRC sublayer 616 is responsible for obtaining radio resources (i.e., radio bearers) and for configuring the lower layers using RRC signaling between the eNodeB and the UE.

Figure 7:
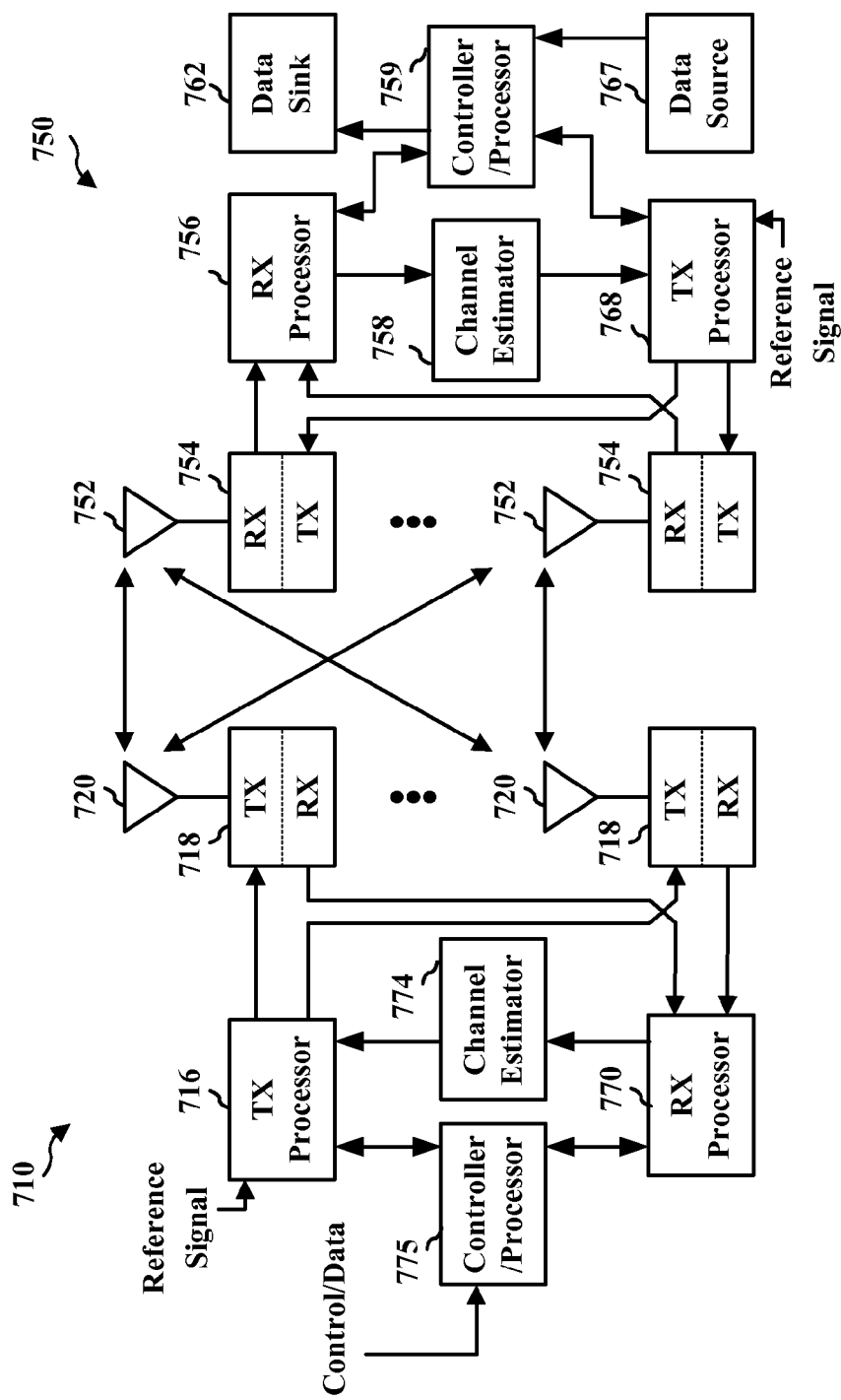
FIG. 7 is a diagram illustrating an example of an eNodeB and UE in an access network.

FIG. 7 is a block diagram of an eNodeB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 710. These soft decisions may be based on channel estimates computed by the channel estimator 758. The soft decisions are then decoded and deinterleaved to recover the data and control signals that were originally transmitted by the eNodeB 710 on the physical channel. The data and control signals are then provided to the controller/processor 759.

The controller/processor 759 implements the L2 layer described earlier in connection with FIG. 5. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNodeB 710, the controller/processor 759 implements the L2 layer for the user plane and the control plane by providing header compression, ciphering, packet segmentation and reordering, and multiplexing between logical and transport channels based on radio resource allocations by the eNodeB 710. The controller/processor 759 is also responsible for HARQ operations, retransmission of lost packets, and signaling to the eNodeB 710.

Channel estimates derived by a channel estimator 758 from a reference signal or feedback transmitted by the eNodeB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNodeB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

The processing system 100 described in relation to FIG. 1 includes the eNodeB 710. In particular, the processing system 100 includes the TX processor 716, the RX processor 770, and the controller/processor 775.

Figure 8:
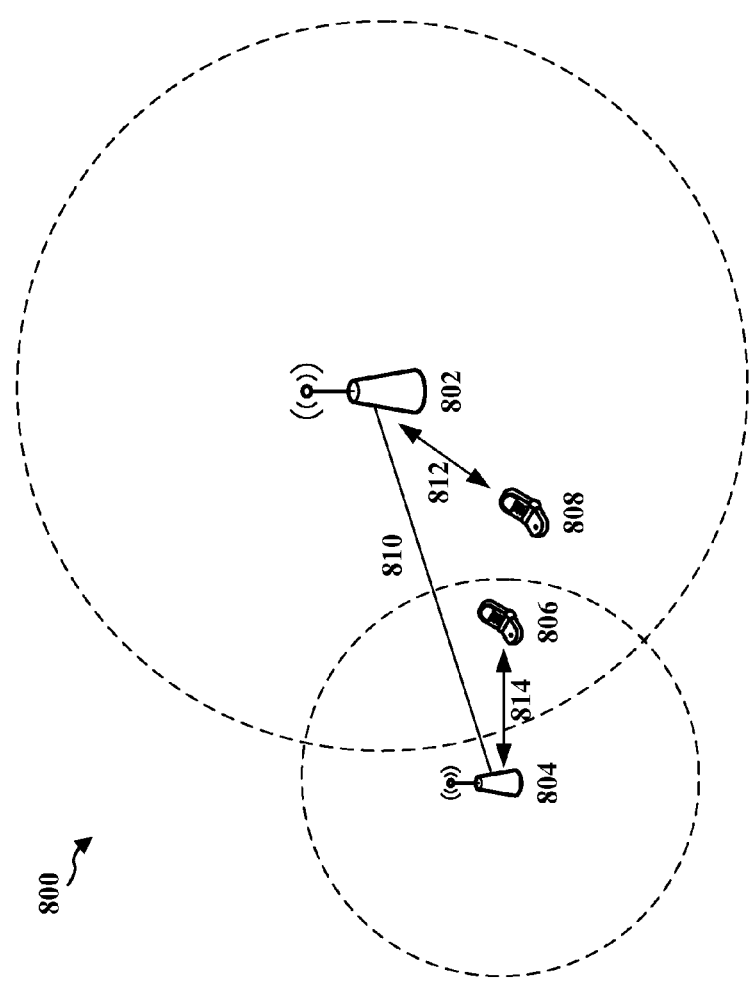
FIG. 8 is a diagram illustrating a mechanism for information exchange across cells to facilitate cell reception in a heterogeneous network.

FIG. 8 is a diagram 800 illustrating a mechanism for information exchange across cells to facilitate cell reception in a heterogeneous network. As shown in FIG. 8, the heterogeneous network includes an eNodeB 802 and a femto/pico cell 804. The eNodeB 802 and the femto/pico cell 804 are connected via an X2 interface/backhaul 810. Through the X2 backhaul 810, the femto/pico cell 804 receives system information from the eNodeB 802. With the system information, the femto/pico cell 804 performs enhanced receiver processing to cancel out interfering signals. For example, as shown in FIG. 8, the eNodeB 802 is in communication 812 with the UE 808 and the femto/pico cell 804 is in communication 814 with the UE 806. The femto/pico cell 804 may receive system information for the PRACH, PUCCH, and/or PUSCH associated with the eNodeB 802 in order to cancel out the corresponding communication 812 from the UE 808 from the received signal that includes the communication 814 from the UE 806. The femto/pico cell 804 may therefore improve the communication with the UE 806 by performing interference cancellation of signals associated with other UEs, such as the UE 808, in communication with neighboring eNodeBs, such as eNodeB 802. By canceling the interference, the signal to interference ratio (SIR) of the received signal is improved with respect to the signal from UE 806.

The PRACH system information includes a rootSequenceIndex (RACH_ROOT_SEQUENCE) integer value, PRACH configuration information, a prach-ConfigIndex (prach-ConfigurationIndex) integer value, a highSpeedFlag (High-speed-flag) Boolean value, a zeroCorrelationZoneConfig ($N_{CS}$) integer value, and a prach-FreqOffset (prach-FrequencyOffset) integer value. The PUCCH system information includes a deltaPUCCH-shift ($\Delta_{shift}^{PUCCH}$) enumerated value, an nRB-CQI ($N_{RB}^{(2)}$) integer value, an nCS-AN ($N_{CS}^{(1)}$) integer value, an n1PUCCH-AN ($N_{PUCCH}^{(1)}$) integer value, an ackNackRepetition value, a repetitionFactor ($N_{ANRep}$) enumerated value, an n1PUCCH-AN-Rep ($n_{PUCCH}^{(1)}$) integer value, and a tdd_AckNackFeedback-Mode enumerated value. The PUSCH system information includes a n-SB ($N_{sb}$) integer value, a hoppingMode (Hopping-mode) enumerated value, a pusch-HoppingOffset ($N_{RB}^{HO}$) integer nteger value, an enable64 QAM Boolean value, a u1-ReferenceSignalsPUSCH value, a betaOffset-ACK-Index ($I_{offset}^{HARQ-ACK}$) integer value, a betaOffset-RI-Index ($I_{offset}^{RI}$) integer value, a betaOffset-CQI-Index ($I_{offset}^{CQI}$) integer value, a groupHoppingEnabled (Group-hopping-enabled) Boolean value, a groupAssignment-PUSCH ($\Delta SS$) integer value, a sequenceHoppingEnabled (Sequence-hopping-enabled) Boolean value, and a cyclicShift integer value. The aforementioned system information is discussed in Section 6.3.2 of 3GPP TS 36.331 version 9.0.0 Release 9. The femto/pico cell 804 may obtain additional information such as the global cell ID of the eNodeB 802 in addition to the system information necessary to decode the PRACH, PUCCH, and/or PUSCH.

Figure 9:
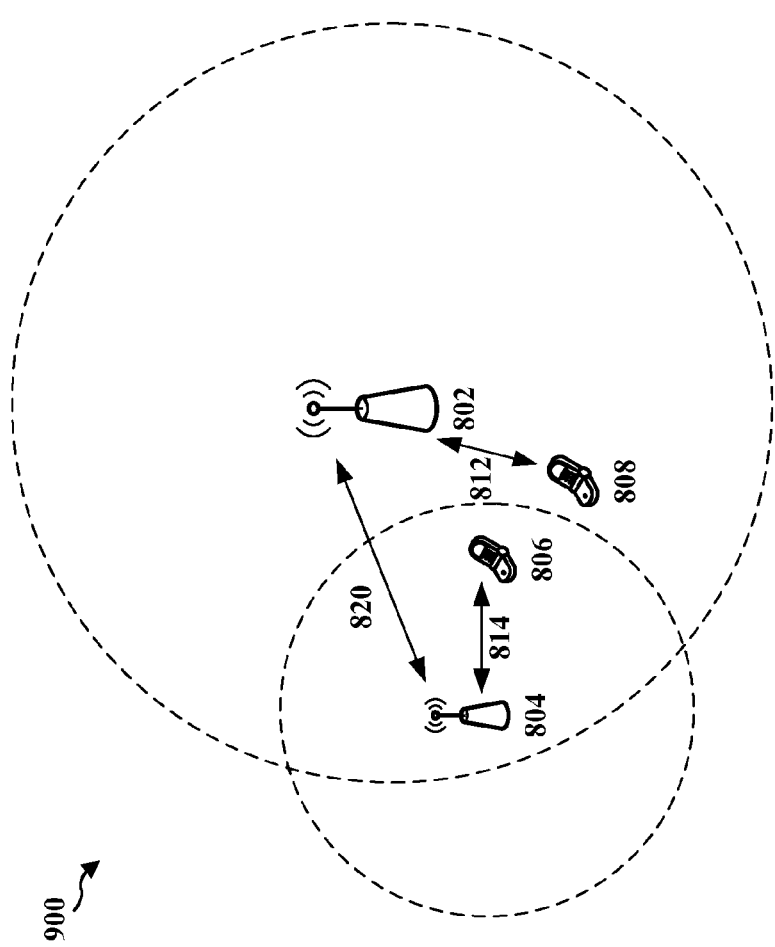
FIG. 9 is another diagram illustrating a mechanism for information exchange across cells to facilitate cell reception in a heterogeneous network.

FIG. 9 is a diagram 900 illustrating another mechanism for information exchange across cells to facilitate cell reception in a heterogeneous network. If the femto/pico cell 804 does not have an X2 backhaul connection to the eNodeB 802 and the femto/pico cell 804 is within range of the eNodeB 802, the femto/pico cell 804 may read the system information 820 broadcasted by the eNodeB 802. That is, the femto/pico cell 804 may read the system information block (SIB) that is broadcasted from the eNodeB 802 to obtain the requisite system information for performing enhanced receiver processing to cancel out the corresponding communication 812 from a signal that includes the communication 814 from the UE 806.

Figure 10:
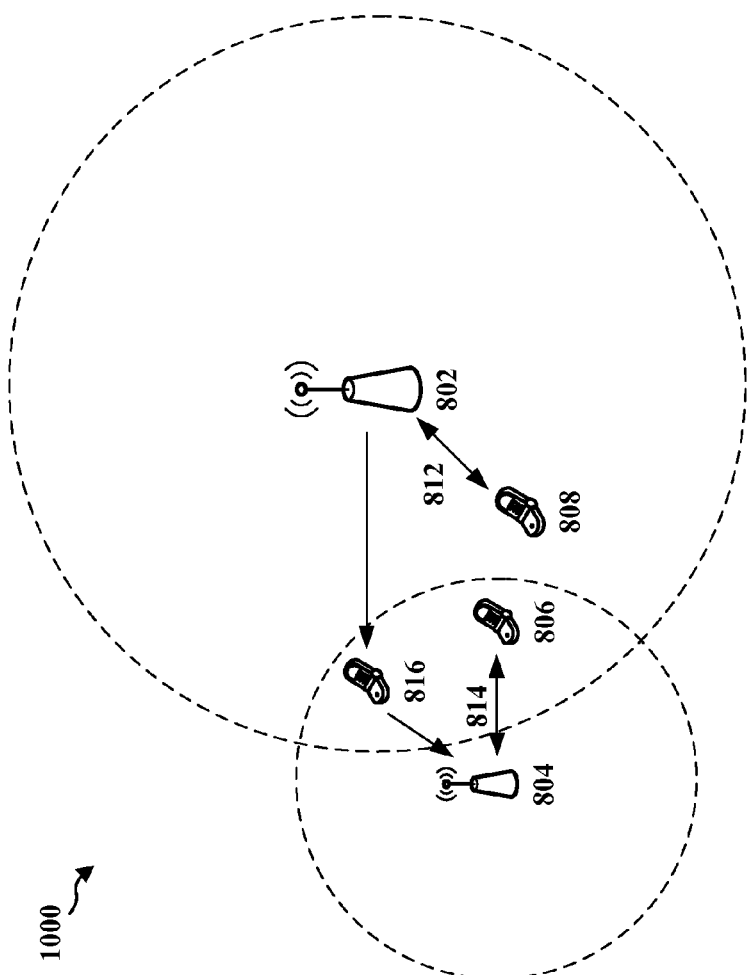
FIG. 10 is yet another diagram illustrating a mechanism for information exchange across cells to facilitate cell reception in a heterogeneous network.

FIG. 10 is a diagram 1000 illustrating yet another mechanism for information exchange across cells to facilitate cell reception in a heterogeneous network. If the femto/pico cell 804 is outside the range of the eNodeB 802 or does not have the ability to obtain the system information from the eNodeB 802 directly over the air, the femto/pico cell 804 may request the UE 816, which is within the range of the eNodeB 802, to obtain the requisite system information and relay the obtained system information to the femto/pico cell 804. With the system information, the femto/pico cell 804 can perform enhanced receiver processing to cancel out the corresponding communication 812 from the UE 808 from a signal that includes the communication 814 from the UE 806.

Figure 11:
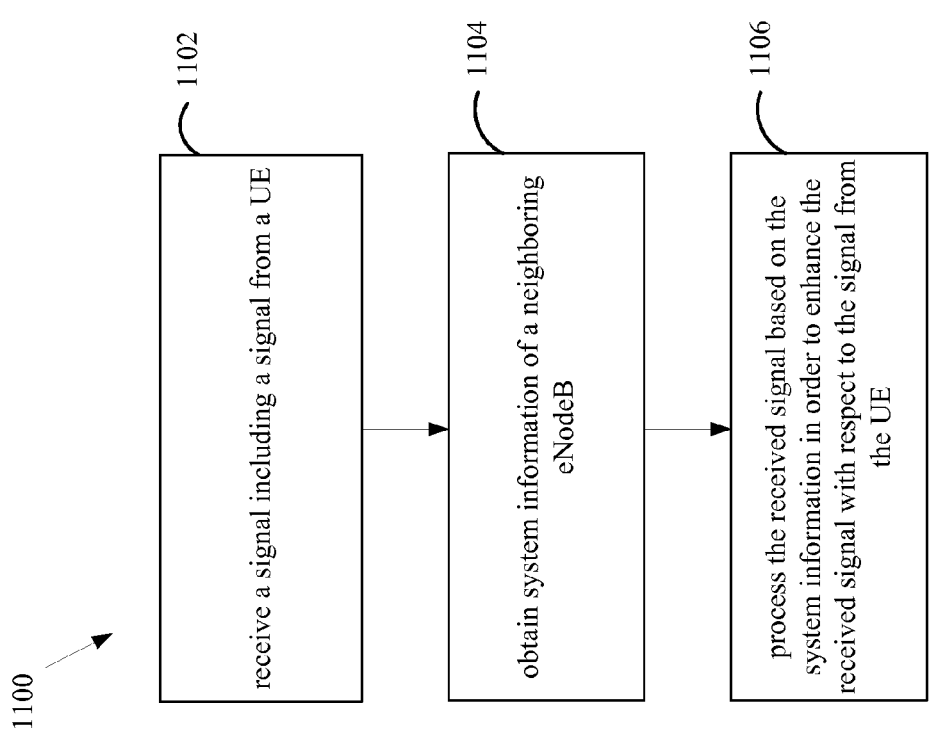
FIG. 11 is a flow chart of a method of wireless communication.

FIG. 11 is a flow chart 1100 of a method of wireless communication. The method receives a signal including a signal from a UE (1102). In addition, the method obtains system information of a neighboring eNodeB (1104). Furthermore, the method processes the received signal based on the system information in order to enhance the received signal with respect to the signal from the UE (1106). In one configuration, the method obtains additional information including a global cell identification (ID) of the neighboring eNodeB. In one configuration, the received signal includes a signal from a second UE in communication with the neighboring eNodeB and to process the method cancels the signal from the second UE from the received signal based on the system information in order to improve an SIR of the received signal with respect to the signal from the UE. In one configuration, the system information is information for decoding a PRACH transmission from the second UE. In one configuration, the system information is information for decoding a PUCCH transmission from the second UE. In one configuration, the system information is information for decoding a PUSCH transmission from the second UE. System information for other channels other than the PRACH, the PUCCH, and the PUSCH may be obtained for performing enhanced receiver processing to cancel out interference on the other channels.

In one configuration, the system information is obtained through an X2 backhaul with the neighboring eNodeB. In one configuration, the system information is obtained from a broadcast by the neighboring eNodeB. In one configuration, the information is obtained through relay from another UE.

Figure 12:
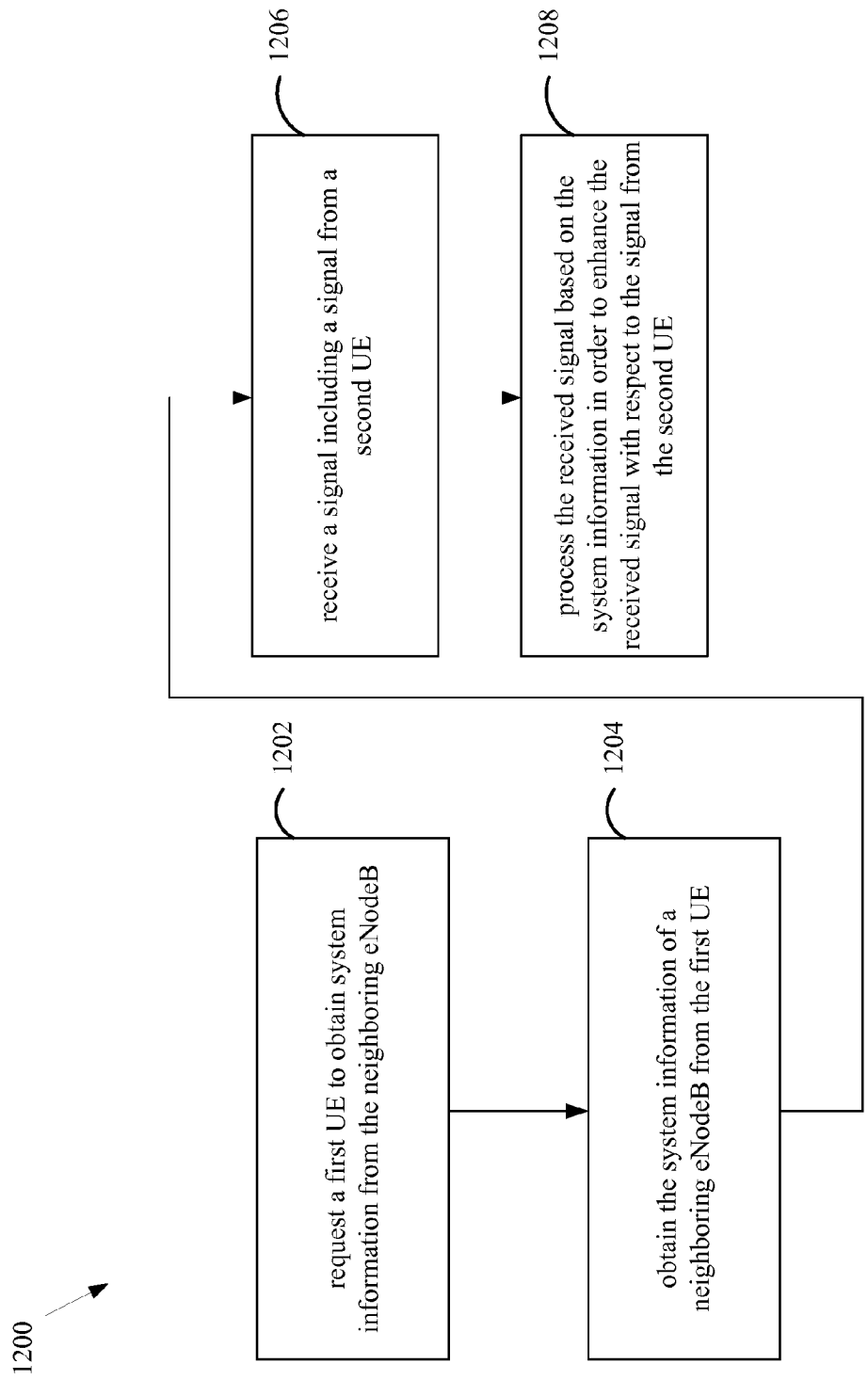
FIG. 12 is another flow chart of a method of wireless communication.

FIG. 12 is a flow chart 1200 of a method of wireless communication. The method requests a first UE 808 to obtain system information from the neighboring eNodeB 802 (1202). In addition, the method obtains the system information of the neighboring eNodeB 802 from the first UE 808 (1204). In addition, the method receives a signal including a signal 814 from a second UE 806 (1206). Furthermore, the method processes the received signal based on the system information in order to enhance the received signal with respect to the signal 814 from the second UE 806 (1208).

Figure 13:
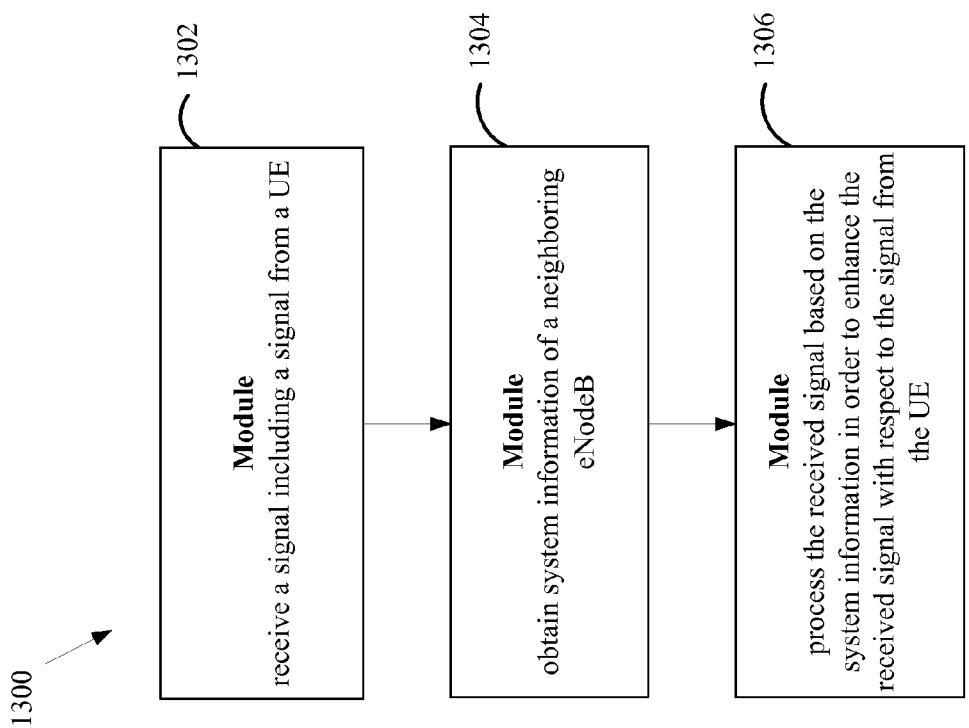
FIG. 13 is a block diagram illustrating the functionality of an exemplary apparatus.

FIG. 13 is a conceptual block diagram 1300 illustrating the functionality of an exemplary apparatus 100. The apparatus 100 may be a femto/pico cell 804 or otherwise a base station (BS). The apparatus 100 includes a module 1302 that receives a signal including a signal from a UE. In addition, the apparatus 100 includes a module 1304 that obtains system information of a neighboring eNodeB. Furthermore, the apparatus 100 includes a module 1306 that processes the received signal based on the system information in order to enhance the received signal with respect to the signal from the UE.

Referring back to FIGS. 1 and 7, in one configuration, the apparatus 100 for wireless communication includes means for receiving a signal including a signal from a UE, means for obtaining system information of a neighboring eNodeB, and means for processing the received signal based on the system information in order to enhance the received signal with respect to the signal from the UE. The aforementioned means is the processing system 114 configured to perform the functions recited by the aforementioned means. As described supra, the processing system 114 includes the TX Processor 716, the RX Processor 770, and the controller/processor 775. As such, in one configuration, the aforementioned means may be the TX Processor 716, the RX Processor 770, and the controller/processor 775 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a signal including a signal from a mobile station;
   obtaining system information comprising one or more parameters broadcasted in a system information block (SIB) by a neighboring base station, wherein obtaining system information comprises requesting a second mobile station to obtain the system information in the SIB broadcasted by the neighboring base station, wherein the system information is obtained from the second mobile station, and wherein the system information comprises information for decoding one or more transmissions from a third mobile station associated with the neighboring base station; and
   processing the received signal based on the system information in order to enhance the received signal with respect to the signal from the mobile station.

2. The method of claim 1, wherein the information for decoding is for decoding a physical random access channel transmission from the third mobile station.

3. The method of claim 2, wherein the information for decoding a physical random access channel transmission comprises one or more of a root sequence index integer value, a physical random access channel configuration information integer value, a high-speed flag Boolean value, a zero correlation zone configuration integer value, or a physical random access channel frequency offset integer value.

4. The method of claim 1, wherein the information for decoding is for decoding a physical uplink control channel transmission from the third mobile station.

5. The method of claim 4, wherein the information for decoding a physical uplink control channel transmission comprises one or more of a delta physical uplink control channel shift enumerated value, a number of resource blocks for channel quality information reporting integer value, a cyclic shift integer value, an acknowledgement or non-acknowledgement repetition value, a repetition factor enumerated value, or a time division duplex acknowledgement or non-acknowledgement feedback mode enumerated value.

6. The method of claim 1, wherein the information for decoding is for decoding a physical uplink shared channel transmission from the third mobile station.

7. The method of claim 6, wherein the information for decoding a physical uplink shared channel transmission comprises one or more of a number of sub-bands integer value, a hopping mode enumerated value, a physical uplink shared channel hopping offset integer value, and enable 64 QAM Boolean value, a beta offset acknowledgement index integer value, a beta offset rank indicator integer value, a beta offset channel quality indicator index value, a group hipping enabled Boolean value, a group assignment physical uplink shared channel Boolean value, a sequence hopping enabled Boolean value, or a cyclic shift integer value.

8. The method of claim 1, further comprising obtaining additional information comprising a global cell identification of the neighboring base station.

9. The method of claim 1, wherein the received signal includes a signal from a third mobile station in communication with the neighboring base station and the processing comprises canceling the signal from the third mobile station from the received signal based on the system information in order to improve a signal to interference ratio of the received signal with respect to the signal from the mobile station.

10. The method of claim 1, wherein the system information comprises one or more parameters defined within a third generation global partnership (3GPP) standards document.

11. An apparatus for wireless communication, comprising:
means for receiving a signal including a signal from a mobile station;
means for obtaining system information broadcasted in a system information block (SIB) by a neighboring base station, wherein obtaining system information comprises requesting a second mobile station to obtain the system information in the SIB broadcasted by the neighboring base station, wherein the system information is obtained from the second mobile station, and wherein the system information comprises information for decoding one or more transmissions from a third mobile station associated with the neighboring base station; and
means for processing the received signal based on the system information in order to enhance the received signal with respect to the signal from the mobile station.

12. The apparatus of claim 11, wherein the information for decoding is for decoding a physical random access channel transmission from the third mobile station.

13. The apparatus of claim 11, wherein the information for decoding is for decoding a physical uplink control channel transmission from the third mobile station.

14. The apparatus of claim 11, wherein the information for decoding is for decoding a physical uplink shared channel transmission from the third mobile station.

15. The apparatus of claim 11, further comprising means for obtaining additional information comprising a global cell identification of the neighboring base station.

16. The apparatus of claim 11, wherein the received signal includes a signal from a third mobile station in communication with the neighboring base station and the processing comprises canceling the signal from the third mobile station from the received signal based on the system information in order to improve a signal to interference ratio of the received signal with respect to the signal from the mobile station.

17. A computer program product, comprising:
a non-transitory computer-readable medium comprising code for:
receiving a signal including a signal from a mobile station;
obtaining system information broadcasted in a system information block (SIB) by a neighboring base station, wherein obtaining system information comprises requesting a second mobile station to obtain the system information in the SIB broadcasted by the neighboring base station, wherein the system information is obtained from the second mobile station, and wherein the system information comprises information for decoding one or more transmissions from a third mobile station associated with the neighboring base station; and
processing the received signal based on the system information in order to enhance the received signal with respect to the signal from the mobile station.

18. The computer program product of claim 17, wherein the information for decoding is for decoding a physical random access channel transmission from the third mobile station.

19. The computer program product of claim 17, wherein the information for decoding is for decoding a physical uplink control channel transmission from the third mobile station.

20. The computer program product of claim 17, wherein the information for decoding is for decoding a physical uplink shared channel transmission from the third mobile station.

21. The computer program product of claim 17, wherein the computer-readable medium further comprises code for obtaining additional information comprising a global cell identification of the neighboring base station.

22. The computer program product of claim 17, wherein the received signal includes a signal from a third mobile station in communication with the neighboring base station and the processing comprises canceling the signal from the third mobile station from the received signal based on the system information in order to improve a signal to interference ratio of the received signal with respect to the signal from the mobile station.

23. An apparatus for wireless communication, comprising:
a processing system configured to:
receive a signal including a signal from a mobile station;
obtain system information broadcasted in a system information block (SIB) by a neighboring base station, wherein obtaining system information comprises requesting a second mobile station to obtain the system information in the SIB broadcasted by the neighboring base station, wherein the system information is obtained from the second mobile station, and wherein the system information comprises information for decoding one or more transmissions from a third mobile station associated with the neighboring base station; and
process the received signal based on the system information in order to enhance the received signal with respect to the signal from the mobile station.

24. The apparatus of claim 23, wherein the information for decoding is for decoding a physical random access channel transmission from the third mobile station.

25. The apparatus of claim 23, wherein the information for decoding is for decoding a physical uplink control channel transmission from the third mobile station.

26. The apparatus of claim 23, wherein the information for decoding is for decoding a physical uplink shared channel transmission from the third mobile station.

27. The apparatus of claim 23, wherein the processing system is further configured to obtain additional information comprising a global cell identification of the neighboring base station.

28. The apparatus of claim 23, wherein the received signal includes a signal from a third mobile station in communication with the neighboring base station and the processing comprises canceling the signal from the third mobile station from the received signal based on the system information in order to improve a signal to interference ratio of the received signal with respect to the signal from the mobile station.

29. A method of wireless communication, comprising:
receiving a signal including a signal from a mobile station;
obtaining system information of a neighboring base station; and
processing the received signal based on the system information in order to enhance the received signal with respect to the signal from the mobile station, wherein the received signal includes a signal from a second mobile station in communication with the neighboring base station and the processing comprises canceling the signal from the second mobile station from the received signal based on the system information in order to improve a signal to interference ratio of the received signal with respect to the signal from the mobile station, and wherein obtaining system information further comprises requesting a third mobile station to obtain the system information from the neighboring base station, wherein the system information is obtained from the third mobile station.

30. An apparatus for wireless communication, comprising:
a processing system configured to:
receive a signal including a signal from a mobile station;
obtain system information of a neighboring base station; and
process the received signal based on the system information in order to enhance the received signal with respect to the signal from the mobile station, wherein the received signal includes a signal from a second mobile station in communication with the neighboring base station, and wherein to process the received signal, the processing system is configured to cancel the signal from the second mobile station from the received signal based on the system information in order to improve a signal to interference ratio of the received signal with respect to the signal from the mobile station, and wherein to obtain system information, the processing system is further configured to request a third mobile station to obtain the system information from the neighboring base station, wherein the system information is obtained from the third mobile station.

* * * * *